(12) United States Patent
Heinzelmann et al.

(10) Patent No.: US 8,918,998 B2
(45) Date of Patent: Dec. 30, 2014

(54) HEDGE TRIMMER

(75) Inventors: Georg Heinzelmann, Backnang (DE);
Markus Hittmann, Weinstadt (DE);
Antonio Fattorusso, Kernen (DE);
Marcus Stein, Filderstadt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 672 days.

(21) Appl. No.: 12/641,147

(22) Filed: Dec. 17, 2009

(65) Prior Publication Data

US 2010/0154226 A1 Jun. 24, 2010

(30) Foreign Application Priority Data

Dec. 19, 2008 (DE) .......................... 10 2008 064 007

(51) Int. Cl.
*A01G 3/04* (2006.01)
*A01G 3/053* (2006.01)
(52) U.S. Cl.
CPC ...................................... *A01G 3/053* (2013.01)
USPC .................... 30/208; 30/209; 30/210; 30/216
(58) Field of Classification Search
CPC ......... A01G 3/04; A01G 3/047; A01G 3/053; F02B 23/00
USPC .......... 30/208–210, 216–220, 392–394; D8/8
See application file for complete search history.

(56) References Cited

U.S. PATENT DOCUMENTS

| | | | | |
|---|---|---|---|---|
| 3,757,194 A * | 9/1973 | Weber et al. | ..................... | 30/228 |
| 3,774,303 A * | 11/1973 | Burkett et al. | .................. | 30/382 |
| 3,958,331 A * | 5/1976 | Klebe, Jr. | ......................... | 30/216 |
| 4,084,123 A * | 4/1978 | Lineback et al. | .......... | 30/DIG. 1 |
| 4,145,811 A * | 3/1979 | Kendzior | ........................ | 30/394 |
| 4,261,105 A * | 4/1981 | Love | ................ | 30/383 |
| 4,285,309 A * | 8/1981 | Johansson | ....................... | 30/383 |
| 4,406,066 A * | 9/1983 | Itzrodt | ............................. | 30/382 |
| 4,413,705 A * | 11/1983 | Inaga et al. | ..................... | 30/381 |
| 4,555,849 A * | 12/1985 | Ando et al. | ..................... | 30/388 |
| 4,770,130 A * | 9/1988 | Nagashima | ..................... | 30/381 |
| 4,785,539 A * | 11/1988 | Nagashima | ..................... | 30/381 |
| 4,835,866 A * | 6/1989 | Nagashima | ..................... | 30/381 |
| 4,926,556 A * | 5/1990 | Pilatowicz et al. | ............. | 30/216 |
| 4,932,126 A * | 6/1990 | Pilatowicz et al. | ............. | 30/216 |
| 5,018,492 A * | 5/1991 | Wolf et al. | ....................... | 30/381 |

(Continued)

FOREIGN PATENT DOCUMENTS

DE 102006060617 A1 * 7/2007
DE 102005014576 B4 * 9/2007

(Continued)

*Primary Examiner* — Jason Daniel Prone
(74) *Attorney, Agent, or Firm* — Walter Ottesen P.A.

(57) ABSTRACT

A hedge trimmer having a rear handle, a tubular handle and a blade arrangement with at least one cutter bar disposed in a cutter bar plane. An internal combustion engine drives the cutter bars in a reciprocating manner, and has a combustion chamber and a crankshaft mounted in a crankcase so as to be rotatable about an axis of rotation. The combustion chamber faces the rear handle, and the crankcase faces the blade arrangement. The blade arrangement has a longitudinal central axis, and the hedge trimmer has a longitudinal plane that is disposed parallel to the axis of rotation of the crankshaft and transverse to the cutter bar plane. The longitudinal central axis of the blade arrangement lies in the longitudinal plane of the hedge trimmer.

21 Claims, 5 Drawing Sheets

(56) References Cited

U.S. PATENT DOCUMENTS

| | | | |
|---|---|---|---|
| 5,046,566 A * | 9/1991 | Dorner et al. | 30/381 |
| 5,212,886 A * | 5/1993 | Tasaki | 30/381 |
| 5,243,764 A * | 9/1993 | Wieland | 30/383 |
| 5,305,528 A * | 4/1994 | Garrison | 30/216 |
| 5,445,365 A * | 8/1995 | Förderer | 30/383 |
| 5,595,153 A * | 1/1997 | Hoppner et al. | 30/381 |
| 5,685,080 A * | 11/1997 | Amano et al. | 30/383 |
| 5,697,258 A * | 12/1997 | Aiyama | 30/216 |
| 5,699,865 A * | 12/1997 | Forderer et al. | 30/381 |
| 5,738,064 A * | 4/1998 | Lowe et al. | 30/381 |
| 5,850,698 A * | 12/1998 | Hurn et al. | 30/391 |
| 5,947,866 A | 9/1999 | Nagashima | |
| 6,018,939 A * | 2/2000 | Nagashima | 30/210 |
| 6,192,840 B1 * | 2/2001 | Durr et al. | 30/381 |
| 6,263,579 B1 * | 7/2001 | Nagashima | 30/220 |
| 6,263,979 B1 * | 7/2001 | Dyke et al. | 30/392 |
| 6,354,006 B1 * | 3/2002 | Castelmani | 30/296.1 |
| 6,446,421 B1 * | 9/2002 | Kramer et al. | 30/381 |
| 6,665,943 B1 * | 12/2003 | Sloane et al. | 30/206 |
| 6,799,373 B2 * | 10/2004 | Menzel et al. | 30/381 |
| 6,896,113 B2 | 5/2005 | Kramer | |
| 6,973,726 B2 * | 12/2005 | Kramer | 30/216 |
| 6,994,068 B2 * | 2/2006 | Menzel et al. | 30/381 |
| 7,069,967 B2 * | 7/2006 | Park et al. | 30/475 |
| 7,219,433 B2 * | 5/2007 | Gorenflo et al. | 30/383 |
| D623,487 S * | 9/2010 | Tinius | D8/8 |
| 7,905,261 B2 * | 3/2011 | Hamisch et al. | 30/381 |
| 7,958,642 B2 * | 6/2011 | Rosskamp | 30/228 |
| 8,397,389 B2 * | 3/2013 | Geromiller | 30/208 |
| 8,667,697 B2 * | 3/2014 | Hittmann et al. | 30/353 |
| 8,757,288 B2 * | 6/2014 | Heinzelmann et al. | 30/381 |
| 8,813,369 B2 * | 8/2014 | Kratzig | 30/210 |
| 2003/0111315 A1 | 6/2003 | Kramer | |
| 2004/0049926 A1 * | 3/2004 | Miklosz et al. | 30/391 |
| 2005/0183270 A1 * | 8/2005 | Schmidt et al. | 30/381 |
| 2005/0188550 A1 * | 9/2005 | Uehlein-Proctor et al. | 30/380 |
| 2006/0218796 A1 | 10/2006 | Heinzelmann | |
| 2006/0230623 A1 * | 10/2006 | Ziegs et al. | 30/392 |
| 2007/0084069 A1 * | 4/2007 | Guip | 30/210 |
| 2007/0245575 A1 * | 10/2007 | Rosskamp | 30/392 |
| 2007/0289147 A1 * | 12/2007 | Irwin | 30/381 |
| 2008/0000093 A1 * | 1/2008 | McIntosh | 30/380 |
| 2008/0276469 A1 * | 11/2008 | Guip et al. | 30/383 |
| 2009/0013541 A1 * | 1/2009 | Amend et al. | 30/286 |
| 2009/0193669 A1 * | 8/2009 | Gorenflo | 30/382 |
| 2010/0011597 A1 * | 1/2010 | Bo et al. | 30/381 |
| 2010/0077985 A1 * | 4/2010 | Osawa et al. | 30/381 |
| 2010/0146796 A1 * | 6/2010 | Geromiller | 30/216 |
| 2010/0154227 A1 * | 6/2010 | Heinzelmann | 30/216 |
| 2010/0205811 A1 * | 8/2010 | Heinzelmann et al. | 30/223 |
| 2010/0218386 A1 * | 9/2010 | Ro kamp et al. | 30/312 |
| 2010/0218967 A1 * | 9/2010 | Ro kamp et al. | 173/217 |
| 2011/0179651 A1 * | 7/2011 | Hittmann et al. | 30/216 |
| 2011/0203119 A1 * | 8/2011 | Rosskamp | 30/277.4 |
| 2012/0036722 A1 * | 2/2012 | Hittmann et al. | 30/216 |
| 2012/0151778 A1 * | 6/2012 | Svennung | 30/216 |
| 2013/0031785 A1 * | 2/2013 | Kaupp | 30/208 |
| 2013/0160304 A1 * | 6/2013 | Tate | 30/216 |
| 2013/0326885 A1 * | 12/2013 | Kaupp | 30/208 |
| 2014/0215833 A1 * | 8/2014 | Heinzelmann | 30/216 |

FOREIGN PATENT DOCUMENTS

| | | | |
|---|---|---|---|
| DE | 102007037581 A1 * | 2/2008 | |
| DE | 102008063995 A1 * | 6/2010 | |
| DE | 102008064007 A1 * | 6/2010 | |
| DE | 102010005964 A1 * | 8/2011 | |
| EP | 2198692 A1 * | 6/2010 | |
| EP | 2353367 A1 * | 8/2011 | |
| FR | 2883699 A1 * | 10/2006 | |
| FR | 2940007 A1 * | 6/2010 | |
| GB | 2424563 A * | 10/2006 | |

* cited by examiner

HEDGE TRIMMER

The instant application should be granted the priority date of Dec. 19, 2008, the filing date of the corresponding German patent application 10 2008 064 007.7.

BACKGROUND OF THE INVENTION

The present invention relates to a hedge trimmer.

A hedge trimmer having a rear handle and a tubular handle is disclosed in US 2006/0218796 A1. Such hedge trimmers customarily have a horizontally disposed internal combustion engine, the crankshaft of which drives the cutter bar or cutter bars by means of a gear mechanism. In this connection, the crankcase faces the rear handle, and the cylinder projects toward the front toward the tubular handle and toward the blade arrangement. This arrangement of the internal combustion engine is also shown in detail in US 2003/0111315 A1.

It is an object of the present invention to provide a hedge trimmer of the aforementioned general type that has a smaller overall size and a lower weight.

BRIEF DESCRIPTION OF THE DRAWINGS

This object, and other objects and advantages of the present application, will appear more clearly from the following specification in conjunction with the accompanying schematic drawings, in which.

SUMMARY OF THE INVENTION

The hedge trimmer of the present application comprises a rear handle; a tubular handle; a blade arrangement having at least one cutter bar disposed in a cutter bar plane; and an internal combustion engine for driving the cutter bars in a reciprocating manner, wherein the internal combustion engine has a combustion chamber and a crankshaft that is mounted in a crankcase so as to be rotatable about an axis of rotation, further wherein the combustion chamber faces the rear handle and the crankcase faces the blade arrangement, with the blade arrangement having a longitudinal central axis and the hedge trimmer having a longitudinal plane that is disposed parallel to the axis of rotation of the crankshaft and transverse to the cutter bar plane, and wherein the longitudinal central axis of the blade arrangement lies in the longitudinal plane of the hedge trimmer.

It has been shown that by rotating the internal combustion engine about the axis of rotation of the crankshaft in such a way that the combustion chamber of the internal combustion engine faces the rear handle and the crankcase faces the blade arrangement, a shorter structural length of the overall arrangement can be achieved. By means of the rotated arrangement, the distance between the crankshaft axis and the blade arrangement is reduced. Consequently, the gearbox can on the whole be shorter and therefore significantly lighter. Due to the new arrangement of the internal combustion engine, it is thus possible in a straightforward manner to achieve a smaller overall size and a lower weight of the hedge trimmer.

The internal combustion is advantageously formed in a cylinder having a longitudinal axis that lies in the longitudinal plane of the hedge trimmer. In contrast to the heretofore known arrangement, the internal combustion engine is rotated by 180° about the axis of rotation of the crankshaft. As a result of this arrangement of the longitudinal axis of the cylinder in the longitudinal plane, there results an advantageous weight distribution of the hedge trimmer that improves handling thereof. The crankshaft is advantageously disposed perpendicular to the cutter bar plane, and the longitudinal plane is advantageously a longitudinal central plane that centrally divides the hedge trimmer in the longitudinal direction. However, inclined arrangements of the crankshaft can also be advantageous, with the crankshaft forming an angle of less than 90° with the cutter bar plane.

To further shorten the overall length of the hedge trimmer, the longitudinal axis of the cylinder can form an angle with the longitudinal plane of the hedge trimmer that is between 0° and approximately 45°. This angle is advantageously between approximately 10° and approximately 30°. The portion of the longitudinal axis of the cylinder that extends in the combustion chamber lies on that side of the longitudinal plane of the hedge trimmer on which is disposed an exhaust muffler of the internal combustion engine. The cylinder is thus tilted or inclined toward the exhaust muffler. This results in an advantageous arrangement.

The tank is expediently disposed on that side of the internal combustion engine that faces away from the rear handle. In this connection, the tank is in particular disposed in a region that is spanned by the tubular handle, in other words in a region over which the tubular handle extends. As a result of this arrangement of the tank on that side of the internal combustion engine that faces away from the rear handle, the overall structural length of the hedge trimmer is reduced. Due to the arrangement in a region that is spanned by the tubular handle, the tank is protected by the tubular handle, so that without the need for additional components, damage to the tank can be prevented, for example if the hedge trimmer is dropped. There consequently results a simpler and more robust construction of the hedge trimmer. In this connection, the tank is expediently disposed adjacent to the crankcase. The tubular handle advantageously defines a tubular handle plane that extends transverse to the cutter bar plane and transverse to the longitudinal plane of the hedge trimmer. The rear handle expediently lies in the longitudinal plane of the hedge trimmer.

A straightforward construction results if the hedge trimmer has a handle housing on which are disposed the rear handle and the tubular handle. The hedge trimmer has a drive unit that includes the internal combustion engine, a gear mechanism and the blade arrangement, and which is mounted on the handle housing in a vibration-dampening manner by means of at least one anti-vibration element. The vibration gap, which permits a relative movement between internal combustion engine and handles, is consequently not disposed between the handles and the housing, but rather between the handle housing and the drive unit. Due to the fact that the housing is embodied as a handle housing and is fixedly connected with the handles, a robust construction results. Good guidance properties, and at the same time good vibration-dampening characteristics, are achieved. A good vibration dampening in particular results if the hedge trimmer has four anti-vibration elements by means of which the drive unit is supported on the handle housing, whereby two anti-vibration elements are disposed in the region of the tubular handle, and two anti-vibration elements are disposed on that side of the internal combustion engine that faces the rear handle. In a top view onto the hedge trimmer, the four anti-vibration elements advantageously form the corner points of a rectangle, in particular approximately a rectangle in which the internal combustion engine is disposed.

A straightforward construction results if at least one anti-vibration element includes at least two disk-shaped damping elements. Each damping element advantageously has an inner and an outer edge, and a first and a second end face, whereby one of the edges and one of the end faces of each damping element is in operative connection with the handle housing, while the other edge and the other end face is in operative connection with the drive unit. With two straightforward disk-shaped damping elements, it is thereby possible to achieve an uncoupling or isolation of vibrations in all spatial directions. The damping elements are advantageously embodied as CELLASTO shock mounts or cushions, in other words as foamed polymeric elements. All of the anti-vibration elements of the hedge trimmer expediently have an identical configuration.

Advantageously at least one anti-vibration element is disposed in a recess formed on the handle housing. To limit the relative movement of drive unit and handle housing, at least one recess forms one radial abutment and two axial abutments for the anti-vibration element.

A straightforward construction of the handle housing results if the handle housing includes a housing section and a housing cover, whereby the rear handle and the tubular handle are fixedly connected with the housing section. In this connection, the rear handle is advantageously formed at least partially monolithically with the housing section. A straightforward construction with few structural components results when also the tank is formed at least partially monolithically with the housing section.

The hedge trimmer has a carburetor that is fixedly connected with the internal combustion engine. Consequently, the carburetor is not uncoupled or isolated from the internal combustion engine with regard to vibrations via the anti-vibration elements. The hedge trimmer advantageously has an exhaust muffler. A good weight distribution of the hedge trimmer and hence guidance properties can be achieved if the carburetor and the exhaust muffler are disposed on opposite sides of the longitudinal plane of the hedge trimmer. In this connection, the carburetor and the exhaust muffler are advantageously disposed above the cutter bar plane.

Further specific features of the present invention will be described in detail subsequently.

DESCRIPTION OF SPECIFIC EMBODIMENTS

Figure 1:
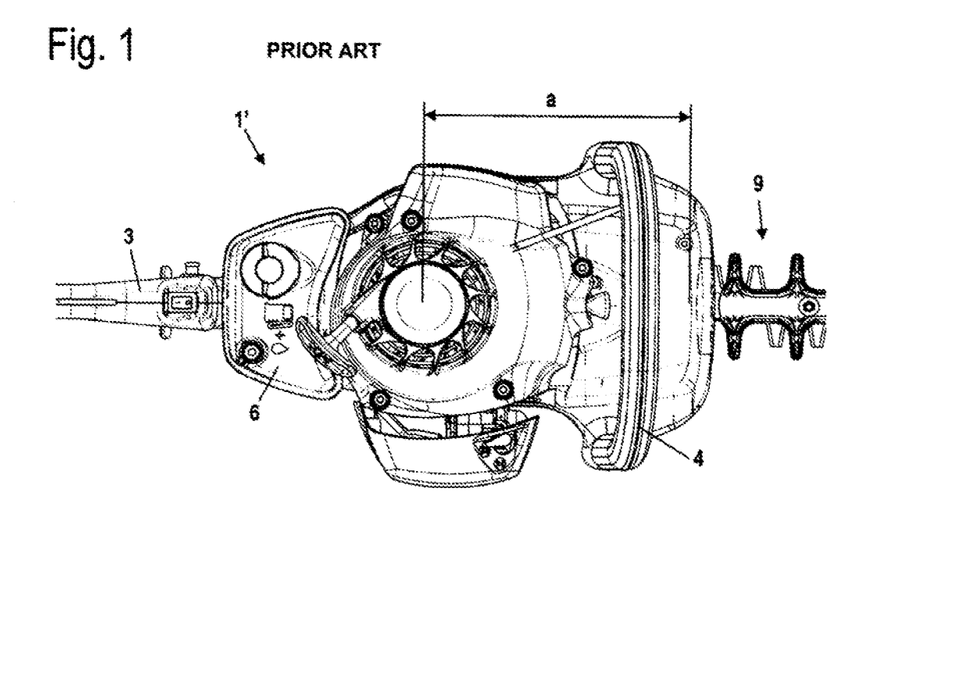
FIG. 1 is a plan view of a hedge trimmer according to the prior art.

FIG. 1 shows a hedge trimmer 1' according to the prior art. The hedge trimmer 1' has a rear handle 3 and, on the opposite side of a motor housing, a blade arrangement 9. A tubular handle 4 is provided on that side that faces away from the rear handle 3. A tank 6 is disposed between the rear handle 3 and the motor housing. The crankcase of the internal combustion engine of the hedge trimmer 1' is oriented toward the rear handle 3, and the cylinder of the internal combustion engine is oriented toward the blade arrangement 9. As a result, the distance a between the axis of rotation of the crankshaft and the blade arrangement 9 is relatively great.

Figure 2:
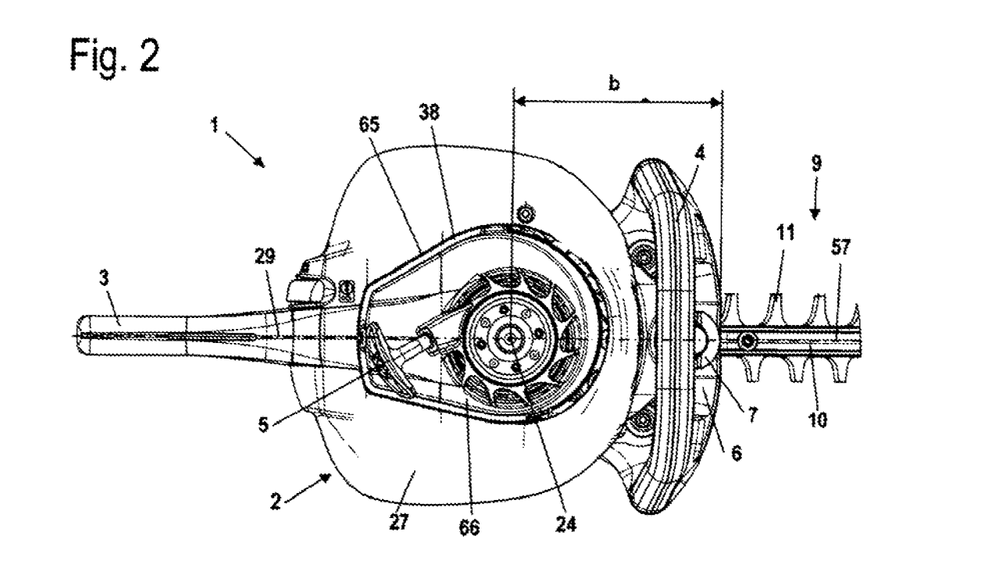
FIG. 2 is a plan view of one exemplary embodiment of a hedge trimmer according to the present application.

FIG. 2 shows a hedge trimmer 1 according to the present application. The hedge trimmer 1 has a handle housing 2 on which are secured a rear handle 3 and a tubular handle 4. The handle housing 2 has a housing cover 27, which is provided with a recess 65 in which is disposed a fan wheel cover 66. A vibration gap 38 is formed between the fan wheel cover 66 and the recess 65. The starter grip 5 (for example a rope pull) of a starter mechanism of an internal combustion engine of the hedge trimmer extends out of the fan wheel cover 66. The rear handle 3 and the tubular handle 4 are disposed on opposite sides of the handle housing 2.

Figure 4:
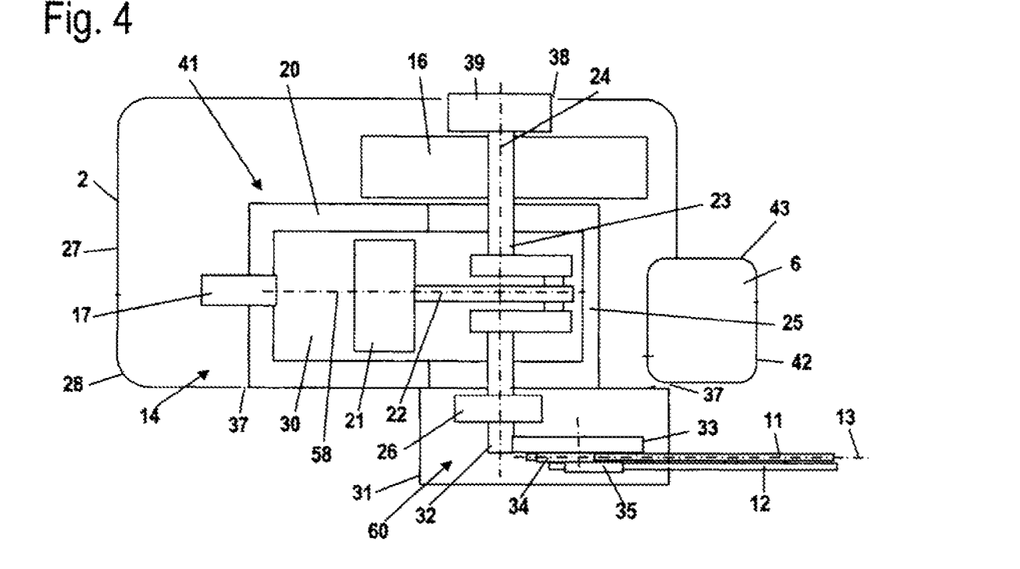
FIG. 4: is a schematic longitudinal cross-sectional illustration through the hedge trimmer of FIG. 2, FIG. 5: is a perspective illustration of a housing section and the blade arrangement of the hedge trimmer.

The hedge trimmer 1 has a blade arrangement 9 having a first blade or cutter bar 11 and a second blade or cutter bar 12 (FIG. 4), which are reciprocably mounted on a guide bar 10. In FIG. 2, the cutter bars 11 and 12 are disposed one over the other in a congruent manner. The blade arrangement 9 extends toward the front on that side of the handle housing 2 that is adjacent to the tubular handle 4. The hedge trimmer 1 has an internal combustion engine, which will be described in greater detail subsequently and that is provided with a crankshaft, the axis of rotation 24 of which has a distance b relative to the blade arrangement 9 that is significantly less than the distance a in the hedge trimmer 1' of the prior art. The hedge trimmer 1 has a longitudinal plane 29 that contains the axis of rotation 24 of the crankshaft. In this connection, the longitudinal plane 29 is the longitudinal central plane of the hedge trimmer 1, and is disposed perpendicularly on a cutter bar plane 13, which is shown in FIG. 4. However, the longitudinal plane 29 can also form an angle of less than 90° with the cutter bar plane 13. The cutter bar plane 13 is the plane in which the first cutter bar 11 extends.

Figure 3:
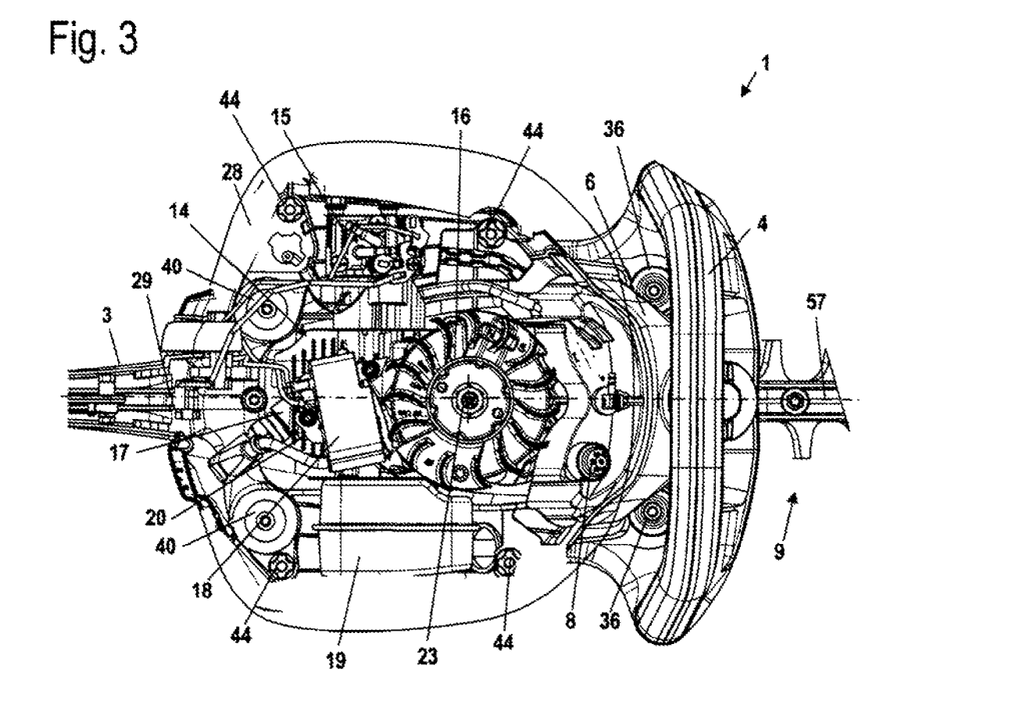
FIG. 3: is a plan view of the hedge trimmer of FIG. 2 with the housing cover removed.

As shown in FIGS. 2 and 3, the blade arrangement 9 has a longitudinal central axis 57. The longitudinal central axis 57 lies in the longitudinal plane 29 of the hedge trimmer 1, and intersects the axis of rotation 24 of the crankshaft 23.

The tubular handle 4 extends in a plane that lies transverse to the longitudinal plane 29. The tubular handle 4 spans or extends over a tank 6. The tank 6 has a closure cap 7 that, when viewed in a top view onto the hedge trimmer 1, is disposed at the level of the tubular handle 4, which extends over the cap. As a result, the closure cap 7 is protected against accidental opening.

FIG. 3 shows the composition of the hedge trimmer 1 in detail. As shown in FIG. 3, the tank 6 has a venting valve 8, which extends out of the tank 6 in the region of the handle housing 2 that is covered by the housing cover 27 (FIG. 2).

Disposed in the handle housing 2 is an internal combustion engine 14, which is provided with a carburetor 15 and an exhaust muffler 19. The carburetor 15 and the exhaust muffler 19 are disposed on opposite sides of the longitudinal plane 29 and, relative to the cutter bar plane 13, are disposed at approximately the same level as is the internal combustion engine 14 and are fixedly connected thereto. The internal combustion engine 14 has a fan wheel 16, which is disposed below the fan wheel cover 66 (FIG. 2). Disposed on the internal combustion engine 14 is an ignition module 18 which makes ignition energy available for a spark plug 17. The spark plug 17 extends into a cylinder 20 of the internal combustion engine 14. The cylinder 20 is disposed adjacent to the rear handle 3, and remote from the blade arrangement 9. Consequently, the spark plug 17 extends in the direction toward the rear handle 3.

The handle housing 2 has a housing section 28, which is covered toward the top by the housing cover 27 shown in FIG. 2. The housing section 28 is provided with a total of four receivers 40 for anti-vibration elements 36. In FIG. 3, the two rear receivers 40 are shown without anti-vibration elements 36, while anti-vibration elements 36 are disposed in the two front receivers 40. As a result, the two front receivers 40 are not visible. The four anti-vibration elements 36 are disposed on imaginary corner points of a square or rectangle, which contains the internal combustion engine 14. Here the quadrangular configuration is nearly rectangular. Two anti-vibration elements 36 are disposed in the region of the tubular handle 4, in other words when viewed in the direction of the longitudinal central axis 57 are disposed approximately at the level of the tubular handle 4, while the two other anti-vibration elements 36 are provided in a region between the cylinder 20 and the rear handle 3. The two anti-vibration elements 36 disposed in the region of the tubular handle 4 are arranged close to the ends of the tubular handle 4 and approximately between the two ends of the tubular handle 4. In FIG. 3, four screw bosses 44 of the housing section 28 are shown at which the housing cover 27 is threadedly connected with the housing section 28.

FIG. 4 shows the composition of a drive unit 41 of the hedge trimmer 1 that includes the internal combustion engine 14, a gear mechanism 60 and the blade arrangement 9. The drive unit 41 additionally includes the fan wheel 16 as well as a starter device 39. As schematically shown in FIG. 4, in the region of the starter device 39 the handle housing 2 is separated from the drive unit 41 by the vibration gap 38, and in the region of a gearbox 31 in which the gear mechanism 60 is disposed, the handle housing 2 is separated from the drive unit 41 by a vibration gap 37. In this connection, the tank 6 is fixedly connected with the handle housing 2 and is separated by the vibration gap 37 from the drive unit 41. As schematically shown in FIG. 4, the tank 6 is comprised of a lower tank half shell 42 and an upper tank half shell 43. The two tank half shells 42, 43 are advantageously interconnected by friction welding.

As schematically shown in FIG. 4, a piston 21 is reciprocably mounted in the cylinder 20. By means of a connecting rod 22, the piston 21 drives a crankshaft 23 that is mounted in a crankcase 25 so as to be rotatable about the axis of rotation 24. The piston 21 delimits a combustion chamber 30, into which the spark plug 17 extends. The combustion chamber 30 is disposed on that side of the piston 21 that faces the rear handle 3 (FIG. 3). The tank 6 is disposed adjacent to the crankcase 25.

The fan wheel 16 is connected with the crankshaft 23 so as to rotate therewith. The starter device 39 is advantageously a spring-type starter device that acts upon the crankshaft 23 and the fan wheel 16. On that side of the crankcase 25 opposite the fan wheel 16, the crankshaft 23 is connected to a centrifugal clutch 26 which connects a driving pinion 32 with the crankshaft 23 as soon as a coupling speed is exceeded.

The driving pinion 32 is part of the gear mechanism 60 and meshes with a gear 33, which is schematically shown in FIG. 4 and on which are disposed a first eccentric or cam 34 and a second eccentric or cam 35. The two eccentrics 34, 35 are both disposed on that side of the gear 33 that faces away from the handle housing 2. The first cutter bar 11 is disposed on the first eccentric 34, and the second cutter bar 12 is disposed on the second eccentric 35. The two cutter bars 11 and 12 are reciprocably driven in opposite directions by means of the eccentrics 34 and 35.

As shown in FIG. 4, the axis of rotation 24 of the crankshaft 23 is disposed perpendicular to the cutter bar plane 13. The cylinder 20 has a longitudinal axis 58 that, as does the axis of rotation 24 of the crankshaft 23, lies in the longitudinal plane 29 of the hedge trimmer 1 (FIGS. 2 and 3).

Figure 5:
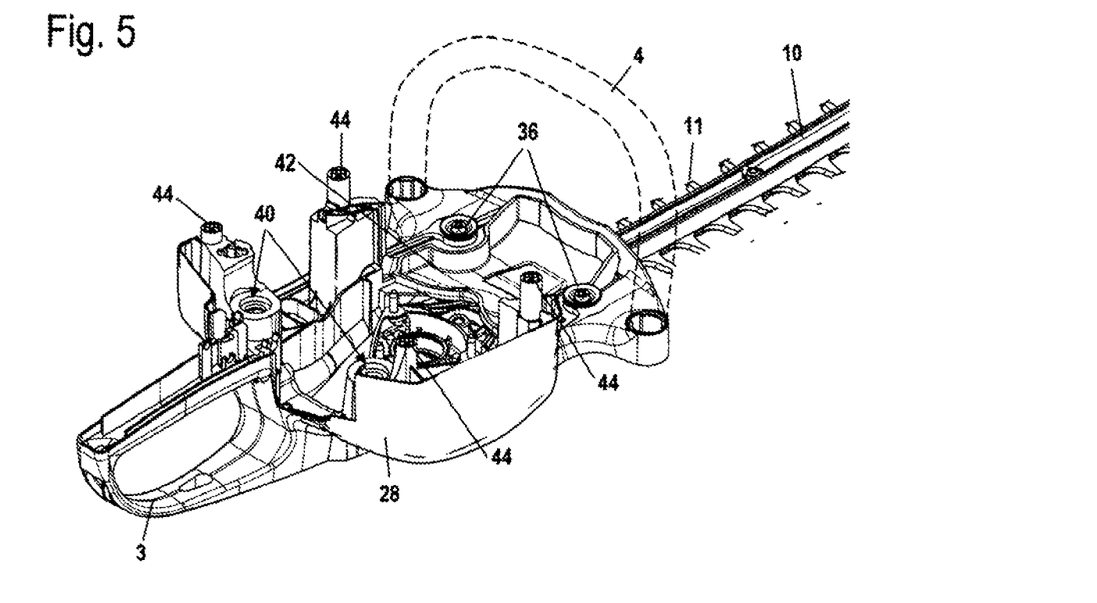

FIG. 5 shows the composition of the housing section 28 in detail. The rear handle 3 is formed on the housing section 28. The upper region of the rear handle 3, on which are mounted control elements for operating the internal combustion engine 14, has an open construction and is closed off by a cover, which is not shown in FIG. 5. The lower tank half shell 42 is also formed on the housing section 28. FIG. 5 also shows how the tank 6 is spanned by the tubular handle 4, and is thus protected against external influences such as impacts or the like.

Figure 6:
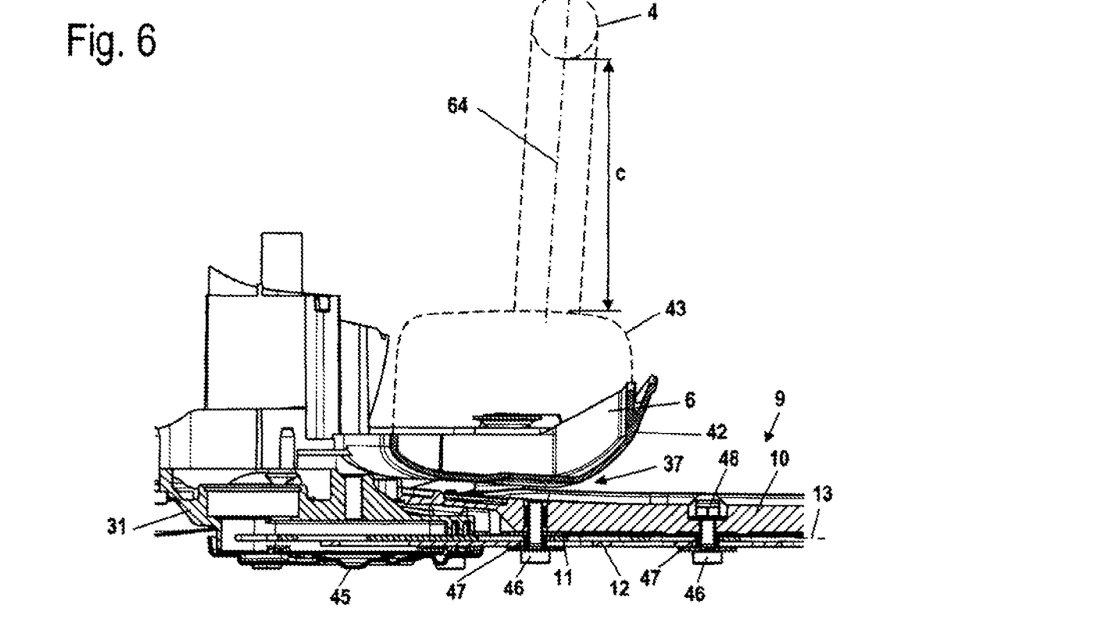
FIG. 6: is a cross-sectional illustration of the arrangement of FIG. 5 in the region of the gear box and of the tank.

FIG. 6 schematically shows the arrangement of the tubular handle 4, which lies in a plane 64 that extends transverse to the cutter bar plane 13. As shown in FIG. 6, the plane 64 of the tubular handle is advantageously slightly inclined relative to the cutter bar plane 13. The plane 64 of the tubular handle 4 lies transverse to the longitudinal plane 29 of the hedge trimmer 1, which in FIG. 6 corresponds to the section plane of the Figure. In this connection, the plane 64 of the tubular handle is advantageously disposed perpendicular to the longitudinal plane 29. The tubular handle 4 advantageously has a mirror-symmetrical configuration relative to the longitudinal plane 29 of the hedge trimmer 1.

As shown in FIG. 6, the tubular handle 4 extends at a distance c above the tank 6, and extends over the tank 6. Thus, the tank 6 is disposed within the region that is spanned by the tubular handle 4. As also shown in FIG. 6, the tank 6 is spaced slightly above the blade arrangement 9 and the gearbox 31, and is separated from them by the vibration gap 37. On that side facing away from the tank 6, the gearbox 31 is covered by a gearbox cover 45, which is advantageously embodied as a sheet metal bending part.

The guide bar 10 of the blade arrangement 9 is embodied as a molded part, advantageously being embodied as a die cast part. In this connection, the guide bar 10 is comprised of a light weight metal, in particular magnesium. Secured to the guide bar 10 are screws 46 that carry sliding guides 47, on which the cutter bars 11 and 12 are mounted in a longitudinally movable manner. The first screw 46 is screwed directly into the guide bar 10, while the further screws 46 are held on the guide bar 10 by nuts 48. By disposing the crankshaft 23 on that side of the cylinder 20 that faces the blade arrangement 9, the gearbox 31 has a relatively short configuration in the longitudinal direction of the hedge trimmer 1. As a result, the gearbox 31 has a significantly lower weight in comparison with known hedge trimmers 1'.

Figure 7:
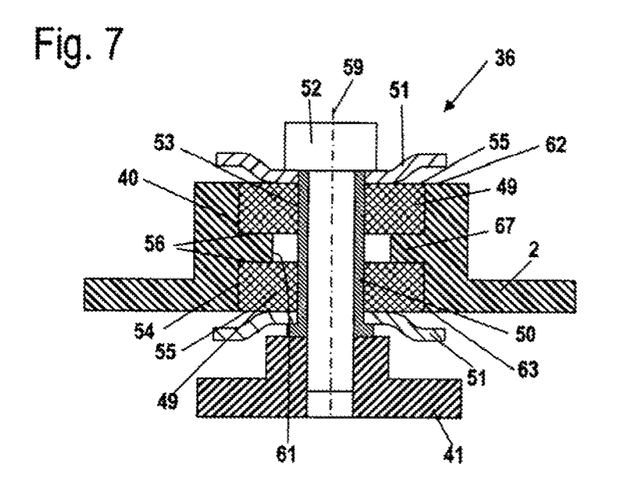
FIG. 7: is a section through an anti-vibration element of the hedge trimmer.

FIG. 7 shows the composition of the anti-vibration elements 36, via which the drive unit 41 is mounted on the handle housing 2. All of the anti-vibration elements 36 advantageously have the same configuration. The anti-vibration element 36 has two damping elements, which are embodied as CELLASTO or microcellular polyurethane shock mounts 49. The CELLASTO shock mounts or cushions 49 are comprised of foamed polymeric material, and have good vibration-dampening or shock-absorbing properties. The CELLASTO shock mounts 49 have a disk-shaped configuration and are mounted on a sleeve 50 at a slight distance from one another. The inner edges 53 of the CELLASTO shock mounts 49 rest against the sleeve 50. The outer edges 54 of the CELLASTO shock mounts 49 are held in the receiver, or recess, 40 of the handle housing 2. The recess 40 has a cylindrical configuration, with a central, circumferential collar or flange 67 that extends between the two CELLASTO shock mounts 49. The outer first end faces 55 of the two CELLASTO shock mounts 49 respectively rest against a disk 51. The two disks 51 are mounted on the sleeve 50, and at their outer rims are bent away toward the outside and away from the CELLASTO shock mounts 49. The second, inner end faces 56 of the CELLASTO shock mounts 49 rest against the circumferential flange 67 of the recess 40. A screw 52 extends through the sleeve 50, with the longitudinal central axis of the screw 52 coinciding with a longitudinal central axis 59 of the anti-vibration element 36. One end face of the sleeve 50 rests against the head of the screw 52, and the opposite end face of the sleeve 50 rests against the drive unit 41. The length of the sleeve 50 defines the unloaded axial length of the anti-vibration element 36. With an appropriate dimensioning of the sleeve 50, the anti-vibration element 36 can be preloaded.

The two disks 51 hold the CELLASTO shock mounts 49 between the head of the screw 52 and the drive unit 41, and form abutment surfaces for the CELLASTO shock mounts 49. The outwardly bent rims of the disks 51 cooperate with axial stops 62 and 63 that are formed on the end faces of the recess 40. As a result, the axial movement of the anti-vibration element 36, in other words the relative movement of the handle housing 2 relative to the drive unit 41 in the direction of the longitudinal central axis 59, is limited. To limit the radial movement, formed on the inner side of the collar or flange 67 is a radial abutment 61 that cooperates with the outer wall of the sleeve 50 and thus limits the radial relative movement between handle housing 2 and drive unit 41.

The illustrated construction of the anti-vibration elements 36 is straightforward, and simple disk-shaped CELLASTO shock mounts 49 can be utilized. At the same time, good vibration-dampening properties are achieved. The anti-vibration elements 36 have abutments in both the radial and axial directions, so that no separate stops or abutments need be provided. If the CELLASTO shock mounts 49 are destroyed, the handle housing 2 and the drive unit 41 are still connected to one another by means of the disks 51, so that even with failure of the CELLASTO shock mounts 49, the handle housing 2 remains connected to the drive unit 51.

Figure 8:
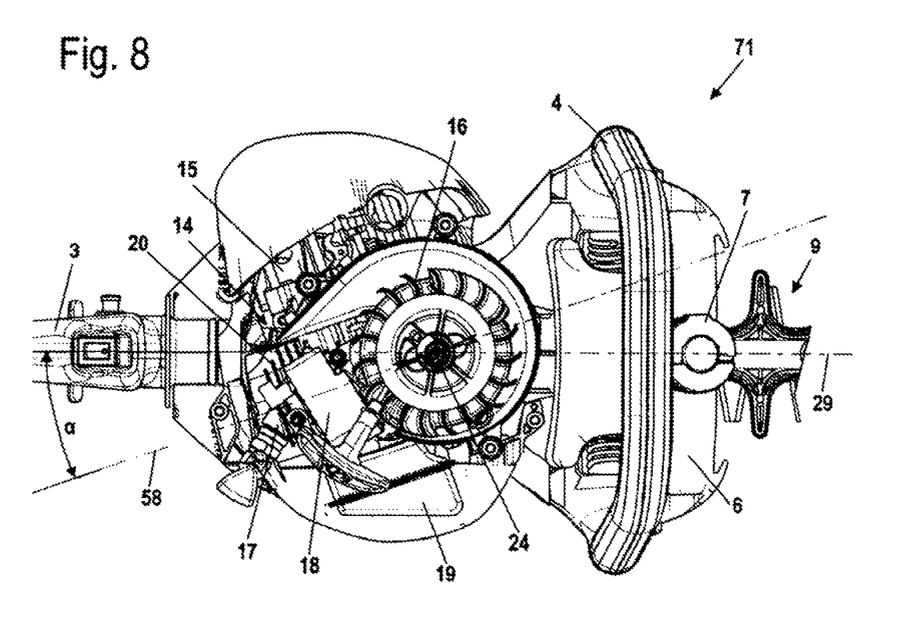
FIG. 8 is a plan view of another exemplary embodiment of an inventive hedge trimmer with the housing cover removed.
Figure 9:
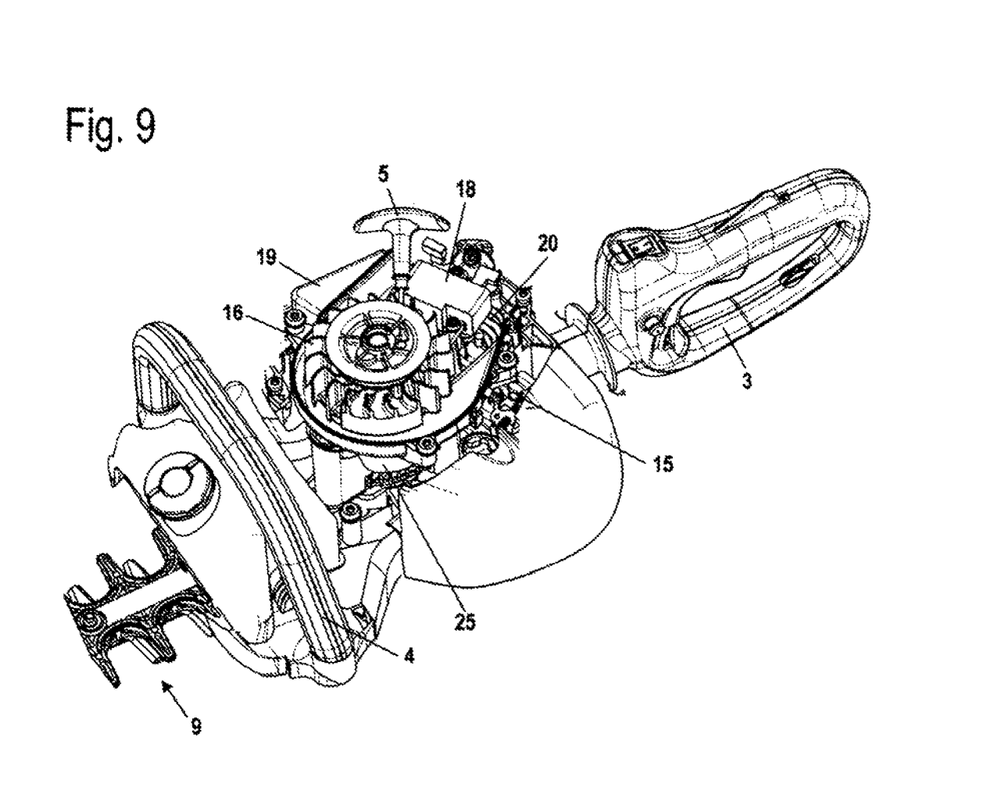
FIG. 9 is a perspective illustration of the hedge trimmer of FIG. 8 with the housing cover removed.

FIGS. 8 and 9 show an exemplary embodiment of a hedge trimmer 71, the construction of which essentially corresponds to that of the hedge trimmer 1. The same reference numerals represent corresponding elements. The hedge trimmer 71 has an internal combustion engine 14 with a crankcase 25 and a cylinder 20. A tubular handle 4 of the hedge trimmer 71 faces the crankcase 25. A non-illustrated combustion chamber, into which a spark plug 17 extends, is formed in the cylinder 20. The cylinder 20 has a longitudinal axis 58, which forms an angle α of greater than 0° with the longitudinal plane 29 of the hedge trimmer 71. The angle α is advantageously between 0° and approximately 45°, and in particular is between approximately 10° and approximately 30°. An angle α of approximately 20° has been shown to be particularly advantageous. In this connection, the longitudinal axis 58 of the cylinder 20, in the region disposed between the axis of rotation 24 of the crankshaft 23 and the rear handle 3, is inclined on the side of the longitudinal plane 29 on which the exhaust muffler 19 is disposed. In the region between the axis of rotation 24 of the crankshaft 23 and the tubular handle 4, the longitudinal axis 58 of the cylinder 20 extends on the side of the longitudinal plane 29 on which the carburetor 15 is disposed. As shown in particular in FIG. 8, the spark plug 17 extends laterally outwardly. Due to the fact that the spark plug 17 is not disposed between the cylinder 20 and the rear handle 3, but rather is laterally offset therefrom, the overall size of the hedge trimmer 71 can be further reduced.

The specification incorporates by reference the disclosure of German priority document 10 2008 064 007.7 filed Dec. 19, 2008.

The present invention is, of course, in no way restricted to the specific disclosure of the specification and drawings, but also encompasses any modifications within the scope of the appended claims.

What I claim is:

1. A hedge trimmer comprising:
  a rearward handle;
  a tubular handle;
  a blade assembly having at least one cutter bar defining a cutter bar plane;
  an internal combustion engine including a cylinder and a crankcase connected to said cylinder;
  said engine including a piston arranged in said cylinder so as to be movable back and forth therein;
  said cylinder defining a combustion chamber delimited by said piston;
  a crankshaft rotatably mounted in said crankcase for rotation about a rotational axis; and,
  said piston being operatively connected to said crankshaft so as to impart rotation thereto about said rotational axis;
  said at least one cutter bar being operatively connected to said crankshaft so as to cause said at least one cutter bar to be driven to move back and forth;
  said blade assembly defining a longitudinal center axis;
  said cylinder defining a cylinder longitudinal axis;
  said hedge trimmer defining a transverse plane containing said rotational axis of said crankshaft and being perpendicular to said cylinder longitudinal axis;
  a tank;
  said transverse plane having a first side and a second side;
  said cylinder and said rearward handle being arranged on said first side of said transverse plane; and,
  said tank being arranged on said second side of said transverse plane.

2. The hedge trimmer of claim 1, wherein said blade assembly is arranged essentially on said second side of said transverse plane.

3. A hedge trimmer comprising:
  an internal combustion engine including a cylinder and a crankcase connected to said cylinder;
  said engine including a piston arranged in said cylinder so as to be movable back and forth therein;
  said cylinder defining a combustion chamber delimited by said piston;
  a crankshaft rotatably mounted in said crankcase for rotation about a rotational axis; and,
  said piston being operatively connected to said crankshaft so as to impart rotation thereto about said rotational axis;
  a rear handle;
  a tubular handle;
  a blade assembly including at least one cutter bar defining a cutter bar plane;
  said crankshaft being operatively connected to said at least one cutter bar for imparting reciprocating motion thereto;
  said blade assembly defining a longitudinal center axis;
  said hedge trimmer defining a longitudinal plane arranged parallel to said rotational axis of said crankshaft and extending transversely to said cutter bar plane;
  said longitudinal plane being further arranged so as to cause said longitudinal center axis of said blade assembly to lie therein;
  a tank;
  said engine having a first end directed toward said rear handle and a second end lying opposite said first end;

said cylinder of said engine being arranged at said first end so as to cause said cylinder to lie closer to said rear handle than said crankcase;

said crankcase being arranged at said second end of said engine so as to cause said crankcase to lie closer to said blade assembly than said cylinder; and, said blade assembly being arranged essentially at said second end of said engine.

4. A hedge trimmer according to claim 3, wherein said cylinder has a longitudinal axis that lies in said longitudinal plane of said hedge trimmer.

5. A hedge trimmer according to claim 3, wherein said cylinder has a longitudinal axis that forms an angle with said longitudinal plane of said hedge trimmer that is between 0° and approximately 45°.

6. A hedge trimmer according to claim 5, wherein said internal combustion engine has an exhaust muffler lying on a side of said longitudinal plane; and, a portion of said longitudinal axis of said cylinder extends in said combustion chamber and lies on said side of said longitudinal plane of said hedge trimmer together with said exhaust muffler of said internal combustion engine.

7. A hedge trimmer according to claim 3, wherein the tank is disposed at said second end of said internal combustion engine facing away from said rear handle.

8. A hedge trimmer according to claim 3, wherein said tank is disposed in a region spanned by said tubular handle.

9. A hedge trimmer according to claim 3, wherein said tubular handle defines a tubular handle plane that extends transverse to said cutter bar plane and transverse to said longitudinal plane of said hedge trimmer.

10. A hedge trimmer according to claim 3, wherein said rear handle lies in said longitudinal plane of said hedge trimmer.

11. A hedge trimmer according to claim 3, which further comprises a handle housing, wherein said rear handle and said tubular handle are disposed on said handle housing.

12. A hedge trimmer according to claim 11, wherein said handle housing includes a housing shell and a housing cover, and wherein said rear handle and said tubular handle are fixedly connected with said housing shell.

13. A hedge trimmer according to claim 12, wherein said rear handle is at least partially monolithic with said housing shell.

14. A hedge trimmer according to claim 12, wherein said tank is at least partially monolithic with said housing shell.

15. A hedge trimmer according to claim 3, which further includes a carburetor that is fixedly connected with said internal combustion engine, and also includes an exhaust muffler, wherein said carburetor and said exhaust muffler are disposed on opposite ones of said first and second sides of said longitudinal plane of said hedge trimmer.

16. A hedge trimmer comprising:
a rear handle;
a tubular handle;
a blade assembly including at least one cutter bar defining a cutter bar plane;
a gear mechanism operatively connected to said blade assembly;
an internal combustion engine configured to impart reciprocating movement to said at least one cutter bar via said gear mechanism;
said engine, said gear mechanism and said blade assembly conjointly defining a part of a drive unit of said hedge trimmer;
a tank having an upper side;
a handle housing and said rear handle and said tubular handle being mounted thereon;
at least two anti-vibration elements mounted between ends of said tubular handle;
said drive unit being supported on said handle housing via said at least two anti-vibration elements in a vibration-damping manner;
said tubular handle spanning over said upper side of said tank;
said blade assembly extending below said tank and being separated from said tank by a vibration gap;
said engine including a cylinder and a piston arranged in said cylinder so as to be movable back and forth therein;
said engine further including a crankcase connected to said cylinder;
said cylinder defining a combustion chamber delimited by said piston;
a crankshaft rotatably mounted in said crankcase for rotation about a rotational axis;
said internal combustion engine having a first end facing toward said rear handle and said cylinder being arranged at said first end so as to cause said cylinder to lie closer to said rearward handle than said crankcase;
said internal combustion engine having a second end facing toward said blade assembly; and,
said crankcase being mounted on said second side of said engine so as to cause said crankcase to lie closer to said blade assembly than said cylinder.

17. A hedge trimmer according to claim 16, wherein at least one of said anti-vibration elements includes two disk-shaped damping elements.

18. A hedge trimmer according to claim 17, wherein each of said damping elements has an inner edge, an outer edge, a first end face, and a second end face, further wherein one of said edges and one of said end faces of each of said damping elements is in operative connection with said handle housing, and wherein the other of said edges and the other of said end faces is in operative connection with said drive unit.

19. A hedge trimmer according to claim 16, wherein at least one of said anti-vibration elements is disposed in a recess formed on said handle housing.

20. A hedge trimmer according to claim 19, wherein said recess has one radial abutment and two axial abutments for one of said anti-vibration elements, and wherein said radial abutment and said axial abutments limit relative movement between said drive unit and said handle housing.

21. The hedge trimmer according to claim 16, wherein the drive unit is mounted in a vibration-dampening manner on said handle housing via at least two further anti-vibration elements that are disposed in a region that lies in the direction of said longitudinal central axis between said cylinder and said rear handle.

* * * * *